United States Patent [19]
Laganá et al.

[11] Patent Number: 5,519,775
[45] Date of Patent: May 21, 1996

[54] DEVICE FOR ELECTRICAL AND/OR ELECTRONIC TELEPHONE CIRCUITS, DESIGNED TO LIMIT THE POWER DISSIPATED WITHIN THEM

[75] Inventors: Paolo Laganá; Mauro Pasetti; Marco Siligoni, all of Milan, Italy

[73] Assignee: SGS-Thomson Microelectronics, S.r.l.

[21] Appl. No.: 306,243

[22] Filed: Sep. 14, 1994

Related U.S. Application Data

[63] Continuation of Ser. No. 225,495, Apr. 11, 1994, abandoned, which is a continuation of Ser. No. 780,615, Oct. 23, 1991, abandoned.

[30] Foreign Application Priority Data

Oct. 24, 1990 [IT] Italy ................................... 21859A90

[51] Int. Cl.⁶ .................................................. H04M 19/00
[52] U.S. Cl. .......................... 379/412; 379/413; 379/399
[58] Field of Search ...................................... 379/412, 413, 379/400, 401, 399

[56] References Cited

U.S. PATENT DOCUMENTS

| | | |
|---|---|---|
| 4,897,872 | 1/1990 | Siligoni et al. .......................... 379/412 |
| 5,029,201 | 7/1991 | Bindels ................................ 379/100 X |

FOREIGN PATENT DOCUMENTS

| | | |
|---|---|---|
| 182475 | 5/1986 | European Pat. Off. . |
| 291169 | 11/1988 | European Pat. Off. . |
| 295683 | 12/1988 | European Pat. Off. . |
| 2065420 | 6/1981 | United Kingdom . |
| 9009703 | 8/1990 | WIPO . |

OTHER PUBLICATIONS

*Patent Abstracts of Japan*, vol. 10, No. 325 (E–451) (2381), published Nov. 6, 1986, relating to Japanese Published Patent Application No. JP–A–61131663, Hitachi Limited, Jun. 6, 1986.

*Patent Abstracts of Japan*, vol. 9, No. 81 (E–307) (1804), published Apr. 10, 1985, relating to Japanese Application JP–A–59212067, Nippon D.D.K., Nov. 30, 1984.

Primary Examiner—Jeffery Hofsass
Assistant Examiner—Jacques M. Saint-Surin
Attorney, Agent, or Firm—Robert Groover; Betty Formby

[57] ABSTRACT

A protection device, for a telephone (or other load) 27 in series with an external protection transistor 2, includes a sensor 6 for detecting common-mode current into the load. The output of the sensor 6 is connected to affect a current source/sink combination, and imbalance in this source/sink combination produces a voltage shift which is indirectly connected to control the protection transistor.

23 Claims, 2 Drawing Sheets

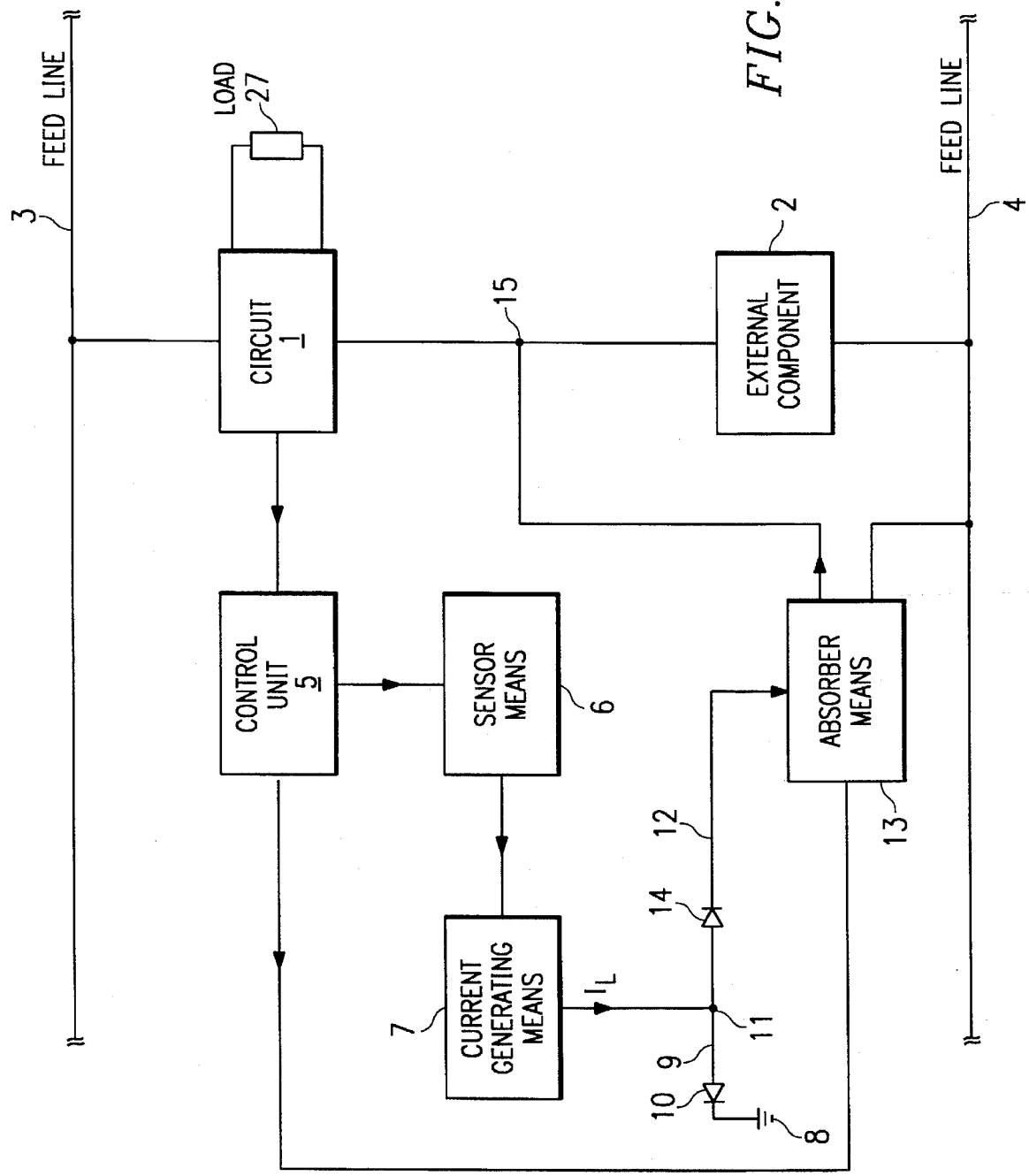

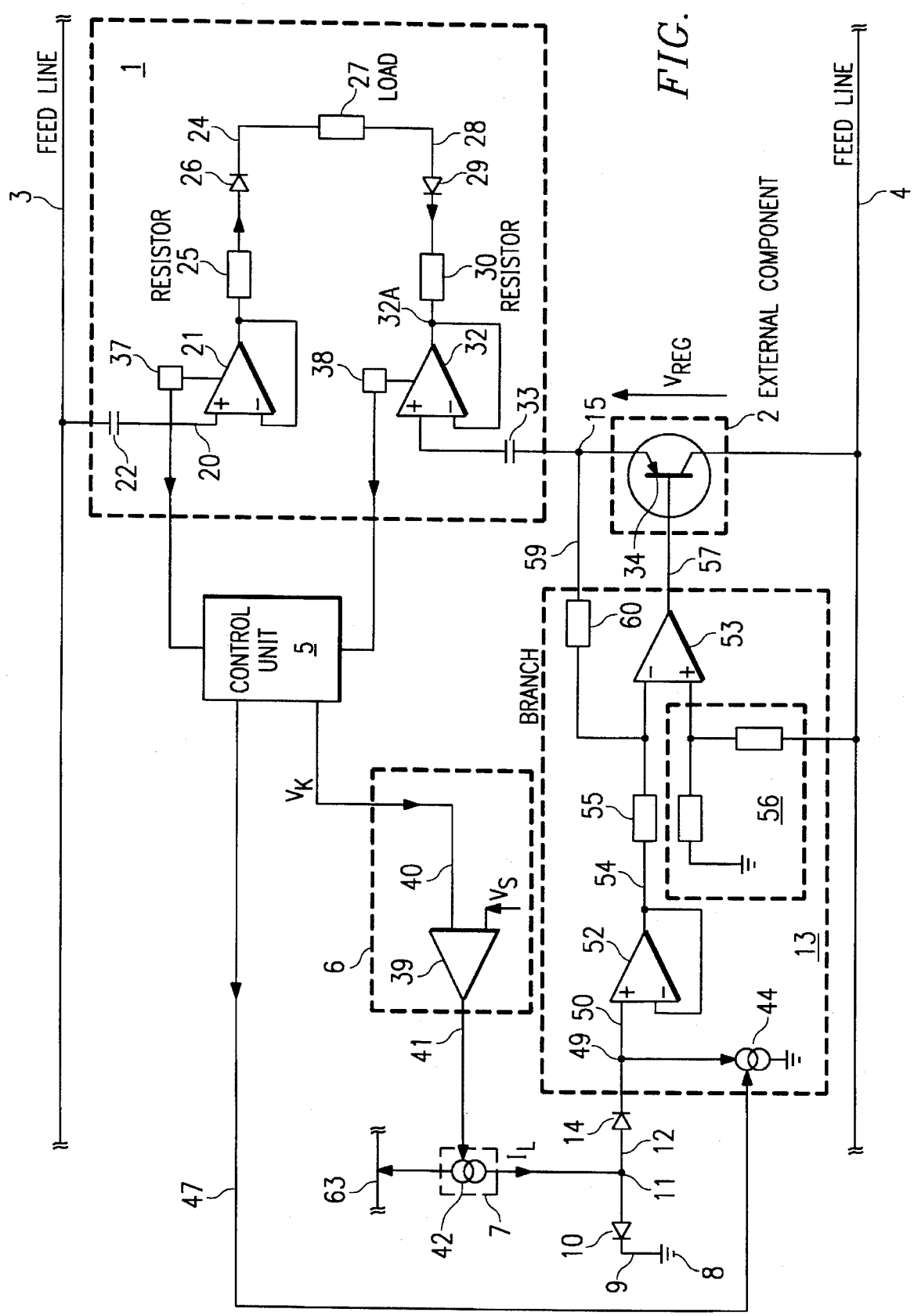

DEVICE FOR ELECTRICAL AND/OR ELECTRONIC TELEPHONE CIRCUITS, DESIGNED TO LIMIT THE POWER DISSIPATED WITHIN THEM

This is a continuation of Ser. No. 08/225,495, filed Apr. 11, 1994 now abandoned, which is a continuation of Ser. No. 07/780,615, filed Oct. 23, 1991 now abandoned and claims priority therethrough from Italian application 21859 A/90, filed Oct. 24, 1990.

BACKGROUND AND SUMMARY OF THE INVENTION

This invention relates to a device for limiting the power dissipated within an electrical and/or electronic circuit connected to a load, such as a telephone.

In circuits of the aforesaid type, the problem frequently arises of limiting the power dissipated within them in order to limit for example the heating of their components.

In the case of telephone circuits, various devices are available for achieving this limitation.

One of these comprises usual means for limiting the maximum current which can be supplied to the line plus a thermal protection circuit which limits the maximum temperature attainable within the circuit connected to the load.

Although this device functions properly during normal operation of the telephone circuit, it cannot operate effectively when the load is subjected to a longitudinal or common-mode current.

In this respect, when the load absorbs a common-mode current from the feed line, devices of the aforesaid type are no longer able to perform their function because the operating threshold of the said limiting means is usually higher than the current passing through the telephone in this situation.

However, the thermal protection circuit continues to operate, and when it does it changes time operating characteristics of the protected circuit to the extent that its operation becomes unacceptable.

To overcome these drawbacks, it is known to couple the load-connected circuit to an external component within which part of the power absorbed by the circuit is dissipated.

Hence in the case of the said known devices, the power dissipated within the circuit is controlled indirectly by controlling the power dissipated within said external component.

This method enables good results to be obtained during normal operation of the telephone, but is problematic when the load to which the telephone circuit is connected becomes the centre of a common-mode current.

This is because the known said devices again in this case suffer from the aforesaid drawbacks, and in particular do not enable the temperature increase in the said external component (caused by the increase in the power dissipated within this component) to be limited.

An object of the present invention is therefore to provide a protection device for an electrical and/or electronic circuit, in particular a telephone circuit of the type connected to an external load, which is able to intervene and effectively protect said circuit (and the load connected to it) under any operating condition.

A particular object of the invention is to provide a device of the aforesaid type which is also able to intervene and effectively protect said circuit when the load is subjected to a longitudinal or common-mode current.

A further object is to provide a device of the aforesaid type which is of simple construction and low cost.

A further object is to provide a device of the aforesaid type which also very reliably protects the external component or components associated with the said circuit.

These and further objects which will be apparent to the expert of the art are attained by a device of the aforesaid type, characterised by comprising sensor means able to determine a common-mode current absorbed by the load, and to control generator means arranged to generate a current signal, the signal emitted by these latter varying in accordance with the determination effected by the sensor means and being at least partly absorbed by absorber means controlled by a control unit connected to measurement means measuring the current passing through the line containing said load, said absorber means being connected at one end to a point downstream of the load, said absorber means, on determination of a common-mode current passing through the load, varying the absorption of the signal emitted by the generator means, to produce a variation in the potential difference across its ends and hence a variation in the potential at the load, this variation limiting the current passing through this latter.

BRIEF DESCRIPTION OF THE DRAWING

The present invention will be more apparent from the accompanying drawings, which is provided by way of non-limiting example and in which:

FIG. 1 is a block diagram of one application of the device according to the invention;

FIG. 2 is a schematic representation of one embodiment of the device shown in FIG. 1.

DESCRIPTION OF THE PREFERRED EMBODIMENTS

FIG. 1 shows a circuit 1 for feeding a load 27, to which an external component 2 is connected in order to at least partly dissipate the power dissipated by said circuit. The circuit 1 and component 2 are connected between two known feed lines 3 and 4.

The circuit 1 is connected to a device for limiting the power dissipated within it and within the component 2; this device comprises a control unit 5 which measures the current passing through said circuit, said unit 5 being connected to sensor means 6 which determine the current absorbed by the load 27 and operate on means 7 for generating a current signal In proportional to the acceptable limiting current passing through the circuit 1. This limiting current is the maximum allowable current through said circuit for the power dissipated within this latter (and within the component 2 connected to it) to remain within values which are not dangerous for the circuit components.

The means 7 are connected to a ground 8 by a branch 9 comprising a diode 10. This branch extends from a node 11 from which a further branch 12 extends to terminate in means 13 able to at least partly absorb the current $I_L$ generated by the means 7. A further diode 14 is contained in the branch 12.

Finally, the absorber means 13 (the function of which is described in detail hereinafter) is connected to the unit 5 and to a node 15 located downstream of the circuit 1, between this latter and the component 2.

Specifically (see FIG. 2), the circuit 1 comprises a branch 20 extending from the line 3 and terminating at the non-inverting input of a first voltage follower 21. The branch 20 contains a usual battery 22.

A branch 24 comprising a resistor 25 and a diode 26 extend from the follower 21. The branch 24 terminates in an active two-terminal network or load 27 from which a further branch comprising a diode 29 and a resistor 30 extends.

A second branch terminates in a second voltage follower 32, the non-inverting input of which is connected to a usual battery 33.

The other terminal of battery 33 is connected to the said node 15, to which the component 2, which in the illustrated example is a transistor 34, is also connected.

Operationally associated with the two voltage followers 21 and 32 there are two usual current measurement means (of known type) 37 and 38. These latter are connected to the control unit 5.

As stated, the unit 5 is connected to the sensor means 6. These determine a common-mode current by comparing a signal $V_K$ from the unit 5 with a threshold signal $V_S$. To achieve this, these means comprise in the example illustrated in FIG. 2 a comparator 39 (advantageously of the type with hysteresis) connected at one input to a branch 40 extending from the unit 5, the other input receiving the threshold signal $V_S$.

The comparator 39 is connected via an output branch 41 to the means 7, which in the illustrated example are a current generator 42. This latter is connected at one end to a point 63 of positive voltage, and as stated is of the type which generates a variable-amplitude current signal determined by the output state of the comparator 39.

The generator 42 is connected via the branch 12 to the absorber means 13, which in the illustrated example is a current generator 44.

This latter is able to absorb in known manner the current generated by the generator 42. The characteristics of the generator 44 are such that it generates during normal operation of the circuit 1 a current which is the image of the current passing through the load 27.

As stated, this latter generator is connected to and controlled in its operation by the control unit 5. This is achieved via a branch 47.

Specifically, in the example illustrated in FIG. 2, the generator 44 is connected at one end to a node 49 from which a branch 50 extends to terminate at the non-inverting input of a voltage follower 52.

This latter is connected to the inverting input of an amplifier 53 via a branch 54 containing a resistor 55.

The amplifier 53 has its non-inverting input connected to a voltage divider 56 and its output connected to the base 57 of the transistor 34.

Finally, a branch 59 containing a resistor 60 extends from the inverting input of the amplifier 53 to terminate at the node 15.

It will be assumed that the circuit 1 is applied to a telephone, and that this circuit together with the device of the invention are to be used.

During normal operation of the telephone, a usual transverse current flows from the line 3 to the line 4 via the branches 20 and 24, the load 27, the branch 28 and the transistor 34.

The measurement means 37 and 38 measure this current and feed their data to the unit 5.

This latter causes the generator 44 to generate a current equal to said transverse current, which it absorbs at the same time. The generator 42 is controlled by the comparator 39, which is itself controlled by the unit 5. This comparator does not act on the generator 42, which remains at a predetermined value, until the unit 5 feeds a signal $V_K$ of amplitude greater than $V_S$, i.e. a common-mode signal.

At the node 11 the current $I_L$ divides into two parts, namely a part flowing to the ground 8 and a part flowing to the generator 44.

A small portion of current also flows to the amplifier 53 to control the transistor 34. This latter portion is of very small value because of the presence of the voltage follower 52, which has a high input impedance.

It will now be assumed that the load 27 is subjected to a common-mode signal, for example because the user, while telephoning, presses the usual earth pushbutton provided on the telephone.

In this situation the unit 5 determines via the measurement means 37 and 38 the presence of a common-mode current through the load 27.

This unit also feeds a signal $V_K$ to the comparator 39 proportional to the amplitude of the determined common-mode current, to reduce time current $I_L$ generated by the generator 42 and at the same time enable the generator 44 to absorb greater current from the node 12.

In this latter case, said generator tends to absorb increasingly more current from this node until substantially all the (reduced) current $I_L$ leaving the generator 42 flows into the generator 44. As a result of this there is a considerable voltage drop across this latter generator.

This voltage drop is sensed at the node 49 to produce, via the follower 52 and the branch 59 (connected to the inverting input of the amplifier 53), an increase in a voltage at the node 15, or an increase in a regulator voltage $V_{REG}$ at the transistor 34.

This voltage increase produces a corresponding voltage increase at the output 32A of the follower 32.

As a result of this, the current passing through the load 27 falls below the reduced $I_L$.

This results in a limitation in the current passing through the load 27 and transistor 34, in which there is therefore a reduction in the dissipated power. The regulating loop, defined substantially by the unit 5, the comparator 39 and the generators 42 and 44, therefore enables said current to be maintained at a value such that the power dissipated within the circuit 1 and external component 2 is less than that which would represent a danger to their stability.

A device constructed in accordance with the invention allows direct control of the power dissipated within the circuit 1 when a common-mode current absorbed by the load 27 is present.

The device is of reliable operation and very simple construction.

It also requires no thermal protection circuit for the circuit 1 and external component 2.

One embodiment of the invention has been described, however different embodiments are possible.

For example, as a modification the direction of the currents emitted by the generators 42 and 44 can be suitably varied to simplify the circuit part between the node 49 and the transistor, This modification and other embodiments equivalent to that described fall within the scope of the present document.

What is claimed is:

1. A protection device for an electrical or electronic circuit connected to a load, in particular a telephone, and to at least one external component, said load and said external component being operatively connected in series between two external lines; comprising a sensor circuit configured and connected
to detect common-mode current absorbed by the load, and
to control a generator circuit which is arranged to generate a current signal
which varies in accordance with the common-mode current detected by said sensor circuit and
which is connected to be at least partly absorbed by an absorber circuit controlled by a control unit which is connected to measurement means for measuring the current passing through said load, said absorber circuit being operatively connected at one end to vary the potential of a point between said load and said external component, said absorber circuit, on detection of a common-mode current by said sensor circuit, varying the absorption of the signal emitted by said generator circuit, to result in a variation in the potential difference across said external component and hence a variation in the potential at said load to limit the current therethrough.

2. A device as claimed in claim 1, wherein said sensor circuit comprises at least one comparator arranged to compare a signal operationally related to the common-mode current absorbed by the load with a threshold signal, said comparator, on the basis of the result of the comparison, acting on said current generator circuit to vary the output thereof.

3. A device as claimed in claim 2, wherein said variation in the output signal said generator circuit is an amplitude variation.

4. A device as claimed in claim 3, wherein said generator circuit is a current generator which emits a signal proportional to an allowable limiting current through one of the set of the circuit, the load connected to it and the external component connected to this circuit.

5. A device as claimed in claim 1, wherein said absorber circuit is a current generator generating a signal operationally related to the usual current absorbed by the load.

6. A device as claimed in claim 5, wherein said control unit is connected to a measurement circuit of known type arranged to determine the current absorbed by and the current leaving the load.

7. A device as claimed in claim 1, wherein at least one member possessing high impedance is connected between the end of said absorber means and said point located between said external component and said load.

8. A device as claimed in claim 1, wherein said high impedance member is connected to an operational amplifier which is connected to the component external to the circuit connected to the load, there being connected to a non-inverting input of said amplifier a branch containing a passive two-terminal network and terminating at said point between said external component and the load.

9. A device as claimed in claim 1, wherein said variation in the output signal of said generator circuit is an amplitude variation.

10. A device as claimed in claim 9, wherein said generator circuit is a current generator which emits a signal proportional to an allowable limiting current through one of the set of the circuit, the load connected to it, and the external component connected to this circuit.

11. A device as claimed in claim 1, wherein at least one member possessing high impedance is connected between the end of said absorber circuit and said point located between said external component and the load.

12. A device as claimed in claim 11, wherein said member possessing high impedance is connected to an operational amplifier which is connected to the component external to the circuit connected to the load, there being connected to a non-inverting input of said amplifier a branch containing a passive two-terminal network and terminating at said point between said external component and the load.

13. A device as claimed in claim 11, wherein said member possessing high impedance is connected to an operational amplifier which is connected to the component external to the circuit connected to the load, said amplifier comprising a non-inverting input connected to a branch containing a passive two-terminal network and terminating at said point between said external component and said load.

14. A telephone protection circuit, comprising:

connections for first and second external lines:

a connection for driving a transistor which is operatively connected, in series with said amplifiers and the load, between said first and second external lines;

first and second amplifiers operatively connected to drive first and second terminals of a load:

sensing circuitry configured and connected to detect the common-mode current at said first and second load terminals;

a first current generator configured to be provide an output which varies if the common-mode current at said first and second load terminals crosses a predetermined threshold value;

a second current generator configured to be provide an output which varies in dependence on the transverse current at said first and second load terminals:

a summing node operatively connected to receive currents corresponding to said respective output currents of both said current generators: and an output amplifier operatively connected to drive the transistor with a signal which is dependent on the voltage of said summing node.

15. The circuit of claim 14, wherein said first current generator is a current source and said second current generator is a current sink.

16. The circuit of claim 14, wherein the transistor is a bipolar transistor.

17. The circuit of claim 14, further comprising a first battery interposed between said first amplifier and said first external line, and a second battery interposed between said second amplifier and said transistor.

18. The circuit of claim 14, further comprising a first diode interposed between said first amplifier and the load, and a second diode interposed between said second amplifier and the load.

19. A telephone protection circuit, comprising: connections for first and second external lines;

first and second amplifiers connected to drive first and second terminals of a load;

a transistor which is operatively connected in series with said first and second amplifiers, and the load, between said first and second external lines, sensing circuitry configured and connected to detect both the common-mode current into the load and also the transverse current across the load: and an output amplifier operatively connected to said sensing circuitry and said transistor, and configured to drive said transistor to increase the impedance thereof, when the common-mode current exceeds a threshold value, to a degree which is dependent on the difference between the transverse and common-mode currents.

20. The circuit of claim 19, wherein said output amplifier is connected to be driven by the sum of respective output currents from: a first current generator, configured to be provide an output which varies if the common-mode current at said first and second load terminals crosses a predetermined threshold value; and a second current generator, configured to be provide an output which varies in dependence on the transverse current across the load.

21. The circuit of claim 19, wherein the transistor is a bipolar transistor.

22. The circuit of claim 19, further comprising a first battery interposed between said first amplifier and said first external line, and a second battery interposed between said second amplifier and said transistor.

23. The circuit of claim 19, further comprising a first diode interposed between said first amplifier and the load, and a second diode interposed between said second amplifier and the load.

* * * * *